(12) United States Patent
Baxter

(10) Patent No.: US 8,490,138 B2
(45) Date of Patent: Jul. 16, 2013

(54) CHANNEL SEARCHING BY CONTENT TYPE

(75) Inventor: John W. Baxter, Richboro, PA (US)

(73) Assignee: Rovi Guides, Inc., Santa Clara, CA (US)

( * ) Notice: Subject to any disclaimer, the term of this patent is extended or adjusted under 35 U.S.C. 154(b) by 0 days.

(21) Appl. No.: 12/616,926

(22) Filed: Nov. 12, 2009

(65) Prior Publication Data

US 2010/0154005 A1 Jun. 17, 2010

Related U.S. Application Data

(63) Continuation of application No. 11/710,458, filed on Feb. 23, 2007, now abandoned.

(51) Int. Cl.
*H04N 5/445* (2006.01)
*G06F 3/00* (2006.01)

(52) U.S. Cl.
USPC .................... 725/56; 725/37; 725/38; 725/39

(58) Field of Classification Search
USPC ......................................................... 725/56
See application file for complete search history.

(56) References Cited

U.S. PATENT DOCUMENTS

| | | | |
|---|---|---|---|
| 3,956,579 A | 5/1976 | Doumit | |
| 4,031,548 A | 6/1977 | Kato et al. | |
| 4,081,753 A | 3/1978 | Miller | |
| 4,170,782 A | 10/1979 | Miller | |
| 4,203,130 A | 5/1980 | Doumit et al. | |
| 4,305,101 A | 12/1981 | Yarbrough et al. | |
| 4,329,684 A | 5/1982 | Monteath et al. | |
| 4,375,651 A | 3/1983 | Templin et al. | |
| 4,381,522 A | 4/1983 | Lambert | |
| 4,390,901 A | 6/1983 | Keiser | |
| 4,394,691 A | 7/1983 | Amano et al. | |
| 4,425,579 A | 1/1984 | Merrell | |
| 4,429,385 A | 1/1984 | Cichelli et al. | |
| 4,464,652 A | 8/1984 | Lapson et al. | |
| 4,488,179 A | 12/1984 | Kruger et al. | |
| 4,495,654 A | 1/1985 | Deiss | |
| 4,527,194 A | 7/1985 | Sirazi | |
| 4,591,840 A | 5/1986 | Curtis et al. | |

(Continued)

FOREIGN PATENT DOCUMENTS

| | | |
|---|---|---|
| DE | 2338380 | 2/1975 |
| DE | 3337204 | 4/1985 |

(Continued)

OTHER PUBLICATIONS

"A New Approach to Addressability," Cable Data product brochure, undated.

(Continued)

*Primary Examiner* — Robert Hance
(74) *Attorney, Agent, or Firm* — Ropes & Gray LLP

(57) ABSTRACT

Systems and method for receiving user channel search criteria, searching for channels based on representative content information, and presenting the channel results to the user. The interactive media guidance application prompts the user to enter channel search criteria by selecting categories or inputting keywords. The interactive media guidance application gathers information about channels in the form of channel attribute data. The channel attributed data identifies attributes of the typical programs provided by the channel over time. The application compares the channel attribute data for each channel with the user-entered channel search criteria. Matches or lack thereof are then displayed to the user by the interactive media guidance application.

20 Claims, 16 Drawing Sheets

U.S. PATENT DOCUMENTS

| | | | |
|---|---|---|---|
| 4,598,288 A | 7/1986 | Yarbrough et al. | |
| 4,635,121 A | 1/1987 | Hoffman et al. | |
| 4,641,205 A | 2/1987 | Beyers, Jr. | |
| 4,689,022 A | 8/1987 | Peers et al. | |
| 4,691,351 A | 9/1987 | Hayashi et al. | |
| 4,706,121 A | 11/1987 | Young | |
| 4,712,105 A | 12/1987 | Kohler | |
| 4,737,993 A | 4/1988 | DeVilbiss | |
| 4,751,578 A | 6/1988 | Reiter et al. | |
| 4,754,326 A | 6/1988 | Kram et al. | |
| 4,787,063 A | 11/1988 | Muguet | |
| 4,802,114 A | 1/1989 | Sogame | |
| 4,807,052 A | 2/1989 | Amano | |
| 4,841,368 A | 6/1989 | Rumbolt et al. | |
| 4,907,079 A | 3/1990 | Turner et al. | |
| 4,908,713 A | 3/1990 | Levine | |
| 4,963,994 A | 10/1990 | Levine | |
| 4,977,455 A | 12/1990 | Young | |
| 5,027,400 A | 6/1991 | Baji et al. | |
| 5,038,211 A | 8/1991 | Hallenbeck | |
| 5,047,867 A | 9/1991 | Strubbe et al. | |
| 5,099,319 A | 3/1992 | Esch et al. | |
| 5,115,310 A | 5/1992 | Takano et al. | |
| 5,123,046 A | 6/1992 | Levine | |
| 5,151,789 A | 9/1992 | Young | |
| 5,172,413 A | 12/1992 | Bradley et al. | |
| 5,187,589 A | 2/1993 | Kono et al. | |
| 5,210,611 A | 5/1993 | Yee et al. | |
| 5,220,625 A | 6/1993 | Hatakeyama et al. | |
| 5,223,924 A | 6/1993 | Strubbe | |
| 5,253,066 A | 10/1993 | Vogel | |
| 5,283,639 A | 2/1994 | Esch et al. | |
| 5,296,931 A | 3/1994 | Na | |
| RE34,611 E | 5/1994 | Fenwick et al. | |
| 5,323,240 A | 6/1994 | Amano et al. | |
| 5,353,121 A | 10/1994 | Young et al. | |
| 5,357,276 A | 10/1994 | Banker et al. | |
| 5,371,553 A | 12/1994 | Kawamura et al. | |
| 5,404,393 A | 4/1995 | Remillard | |
| 5,410,344 A | 4/1995 | Graves et al. | |
| 5,412,720 A | 5/1995 | Hoarty | |
| 5,416,508 A | 5/1995 | Sakuma et al. | |
| 5,434,911 A | 7/1995 | Gray et al. | |
| 5,444,499 A | 8/1995 | Saitoh | |
| 5,465,113 A | 11/1995 | Gilboy | |
| 5,465,385 A | 11/1995 | Ohga et al. | |
| 5,469,206 A | 11/1995 | Strubbe et al. | |
| 5,479,268 A | 12/1995 | Young et al. | |
| 5,479,302 A | 12/1995 | Haines | |
| 5,481,296 A | 1/1996 | Cragun et al. | |
| 5,483,278 A | 1/1996 | Strubbe et al. | |
| 5,485,197 A | 1/1996 | Hoarty | |
| 5,485,221 A | 1/1996 | Banker et al. | |
| 5,488,409 A | 1/1996 | Yuen et al. | |
| 5,517,254 A | 5/1996 | Monta et al. | |
| 5,519,780 A | 5/1996 | Woo et al. | |
| 5,523,796 A | 6/1996 | Marshall et al. | |
| 5,528,304 A | 6/1996 | Cherrick et al. | |
| 5,532,754 A | 7/1996 | Young et al. | |
| 5,534,911 A | 7/1996 | Levitan | |
| 5,543,929 A | 8/1996 | Mankovitz et al. | |
| 5,548,345 A | 8/1996 | Brian et al. | |
| 5,552,837 A | 9/1996 | Mankovitz | |
| 5,562,146 A | 10/1996 | Harmon et al. | |
| 5,579,055 A | 11/1996 | Hamilton et al. | |
| 5,583,560 A | 12/1996 | Florin et al. | |
| 5,589,892 A | 12/1996 | Knee et al. | |
| 5,592,551 A | 1/1997 | Lett et al. | |
| 5,596,373 A | 1/1997 | White et al. | |
| 5,600,364 A | 2/1997 | Hendricks et al. | |
| 5,619,249 A | 4/1997 | Billock et al. | |
| 5,621,456 A | 4/1997 | Florin et al. | |
| 5,623,613 A | 4/1997 | Rowe et al. | |
| 5,629,733 A | 5/1997 | Youman et al. | |
| 5,635,978 A | 6/1997 | Alten et al. | |
| 5,642,153 A | 6/1997 | Chaney et al. | |
| 5,659,350 A | 8/1997 | Hendricks et al. | |
| 5,727,060 A | 3/1998 | Young | |
| 5,731,844 A | 3/1998 | Rauch et al. | |
| 5,758,257 A | 5/1998 | Herz et al. | |
| 5,774,859 A | 6/1998 | Houser et al. | |
| 5,781,246 A | 7/1998 | Alten et al. | |
| 5,808,608 A | 9/1998 | Young et al. | |
| 5,809,204 A | 9/1998 | Young et al. | |
| 5,812,124 A | 9/1998 | Eick et al. | |
| 5,822,123 A | 10/1998 | Davis et al. | |
| 5,880,768 A | 3/1999 | Lemmons et al. | |
| 6,002,394 A * | 12/1999 | Schein et al. | 725/39 |
| 6,008,803 A | 12/1999 | Rowe et al. | |
| 6,052,145 A | 4/2000 | Macrae et al. | |
| 6,177,931 B1 | 1/2001 | Alexander et al. | |
| 6,266,814 B1 | 7/2001 | Lemmons et al. | |
| 6,334,022 B1 | 12/2001 | Ohba et al. | |
| 6,418,556 B1 | 7/2002 | Bennington et al. | |
| 6,426,779 B1 | 7/2002 | Noguchi et al. | |
| RE37,881 E | 10/2002 | Haines | |
| 6,515,680 B1 | 2/2003 | Hendricks et al. | |
| 6,742,184 B1 * | 5/2004 | Finseth et al. | 725/52 |
| 6,760,537 B2 | 7/2004 | Mankovitz | |
| 6,850,693 B2 | 2/2005 | Young et al. | |
| 7,685,619 B1 * | 3/2010 | Herz | 725/52 |
| 2001/0024564 A1 | 9/2001 | Young et al. | |
| 2002/0067376 A1 * | 6/2002 | Martin et al. | 345/810 |
| 2003/0117445 A1 | 6/2003 | Hendricks et al. | |
| 2003/0159147 A1 | 8/2003 | Young et al. | |
| 2004/0103433 A1* | 5/2004 | Regeard et al. | 725/53 |
| 2004/0172648 A1* | 9/2004 | Xu et al. | 725/38 |
| 2005/0125827 A1 * | 6/2005 | Moreau et al. | 725/52 |
| 2005/0157217 A1 | 7/2005 | Hendricks | |
| 2005/0251828 A1 | 11/2005 | Young et al. | |
| 2006/0271955 A1* | 11/2006 | Saito et al. | 725/45 |
| 2007/0011702 A1* | 1/2007 | Vaysman | 725/45 |
| 2007/0288961 A1* | 12/2007 | Guldi et al. | 725/46 |
| 2008/0155595 A1* | 6/2008 | Stallings et al. | 725/39 |

FOREIGN PATENT DOCUMENTS

| | | |
|---|---|---|
| EP | 0183851 A1 | 6/1986 |
| EP | 0219703 A1 | 4/1987 |
| EP | 447 968 | 9/1991 |
| EP | 0523700 A2 | 1/1993 |
| EP | 0572090 A2 | 12/1993 |
| EP | 0648054 A2 | 4/1995 |
| EP | 0682452 | 11/1995 |
| EP | 721253 A2 | 7/1996 |
| GB | 1554411 | 10/1979 |
| GB | 2034995 | 6/1980 |
| GB | 2126002 | 3/1984 |
| GB | 2232031 A | 11/1990 |
| GB | 2264409 A | 8/1993 |
| JP | 59141878 | 8/1984 |
| JP | 03101485 A | 4/1991 |
| JP | 5-075945 A | 3/1993 |
| JP | 05083688 A | 4/1993 |
| JP | 6022233 A | 1/1994 |
| JP | 6061935 A | 3/1994 |
| JP | 06111413 | 4/1994 |
| JP | 06504165 T | 5/1994 |
| JP | 61-74475 A | 6/1994 |
| JP | 6-259835 A | 9/1994 |
| JP | 06303541 | 10/1994 |
| JP | 07098970 A | 4/1995 |
| JP | 07184131 A | 7/1995 |
| JP | 07193762 | 7/1995 |
| WO | WO-86/01359 A1 | 2/1986 |
| WO | WO-90/07844 A1 | 7/1990 |
| WO | WO-9100670 | 1/1991 |
| WO | WO-91/05436 A1 | 4/1991 |
| WO | WO-9204801 A1 | 3/1992 |
| WO | WO-9311640 A1 | 6/1993 |
| WO | WO-9322877 A2 | 11/1993 |
| WO | WO-9323957 A1 | 11/1993 |
| WO | WO-94/14284 A1 | 6/1994 |
| WO | WO-9413107 A1 | 6/1994 |
| WO | WO-94/16441 | 7/1994 |
| WO | WO-9501056 A1 | 1/1995 |
| WO | WO-95/07003 A1 | 3/1995 |
| WO | WO-9532583 A1 | 11/1995 |

| | | |
|---|---|---|
| WO | WO-9532585 A1 | 11/1995 |
| WO | WO-9609721 A1 | 3/1996 |
| WO | WO-9613935 A1 | 5/1996 |
| WO | WO-9617473 A1 | 6/1996 |

OTHER PUBLICATIONS

"Addressable Converters: A New Development at Cable Data," via Cable, Dec. 1981. pp. 1-11.

"Getting Started," Microsoft Access, 1994 Microsoft Corporation.

"Quick Sorts," SmartWare II, 1984-1991 Infomix Software, Inc.

A James, "ORACLE—Broadcasting the Written Word," Wireless World, Jul. 1973, pp. 314-316.

Arthur Heller, "VPS a New System for Domestic VCR Start/Stop by Programme Labels Transmitted Within the Insertion Data Line," Symposium Record, Broadcast Sessions, 14th International TV Symposium, Montreux, Switzerland, Jun. 6-12, 1985, pp. 345-351.

Arthur Heller, "VPS—Ein Neues System Zur Beitragsgesteuerten Programmaufzeichnung," Rundfunktechnische Mitteilungen, Jul.-Aug. 1985, pp. 161-169.

E. Bryan Came, "The Wired Household," IEEE Spectrum, Oct. 1979, pp. 61-66.

G. A. McKenzie, "ORACLE—An Information Broadcasting Service Using Data Transmission in the Vertical Interval," Journal of the SMPTE, Jan. 1974, pp. 6-10.

H. Eckhard Kruger, "Das Digitale Fernsehkennungssystem ZPS," Nachrichtentechnische Zeitschrift, Jun. 1982, pp. 368-376.

Hofmann, Neumann, Oberlies, and Schadwinkel, "Videotext Programmiert Videorecorder," Rundfunktechnische Mitteilungen, Nov.-Dec. 1982, pp. 254-257.

Japanese Office Action dated Sep. 18, 2009, Application No. 2003-353010.

Micheal E. Long, "The VCR Interface," 1986 NCTA Technical Papers, pp. 197-202.

Richard G. Merrell, "Tac-Timer," 1986 NCTA Technical Papers, pp. 203-206.

S. M. Edwardson and A. Gee, "CEEFAX: A Proposed New Broadcasting Service," Journal of the SMPTE, Jan. 1974, pp. 14-19.

Scott Harris, "Pioneering the synergy of Macs, electronics." MacWeek, Mar. 13, 1995.

Sol Cherrick et al. "An Individually Addressable TV Receiver with Interactive Channel Guide display, VCR, and Cable Box Control," IEEE 1994.

Takeuchi et al., "Large Scale Urban Type CATV Systems," National Technical Report, Japan, Matsushita Electric Industrial Co. Ltd., Apr. 18, 1994, vol. 40, No. 2, pp. 113-124.

Vito Brugliera, "Digital On-Screen Display: A New Technology for the Consumer Interface," Symposium Record, Cable Sessions, 18th International Television Symposium and Technical Exhibition, Montreux, Switzerland, Jun. 10-15, 1993, pp. 571-586.

W. Sommerhauser, "Flexibel Programmieren Mit VPS," Funkschau 25, 1985, pp. 47-51.

\* cited by examiner

| DIGITAL CABLE | Q Channels by Content | Listings by Channel | 7:03 pm | LOGO |
|---|---|---|---|---|
| | | 4 CBS | | |
| Everybody Loves Raymond 7-7:30 pm (Sitcom, Series) "Ray's Big Mistake" | Press ENTER to tune to CBS. | | | |
| 7:00 pm | Everybody Loves Raymond | | | |
| 7:30 pm | King of Queens | | | |
| 8:00 pm | Titanic | | | |
| 8:30 pm | | | | |
| 9:00 pm | | | | |
| 9:30 pm | | | | |
| 10:00 pm | | | | |

FIG. 10b

CHANNEL SEARCHING BY CONTENT TYPE

CROSS-REFERENCE TO RELATED APPLICATION

This application is a continuation of U.S. patent application Ser. No. 11/710,458 filed on Feb. 23, 2007, which is hereby incorporated by reference herein in its entirety.

BACKGROUND OF THE INVENTION

This invention is directed to systems and methods for interactive media guidance application searches, and more particularly to interactive media guidance application channel searches for channels according to the types of content offered by the channels.

Currently, media systems typically allow users to search for programs based on attributes of programs, such as title, genre, etc. Sometimes, however, users simply desire knowing what channels provide what types of content. In this mode, users are more flexible in terms of the particular media they seek. For example, a user may want to know what channels offer programs of a particular director, with the idea that if a channel offers programs of that director, the channel may offer other programs that the user would find desirable.

SUMMARY OF THE INVENTION

The above and other needs are addressed by providing a channel search feature in which channels are identified based on the type of content offered by the channel. In this regard, users may search for channels based not necessarily on what is on a channel at the time of a search, but rather the general types of content provided by the channel across time. As used herein, a channel is any identifiable source of real time, or near real time multimedia, including video, audio, or games provided according to a schedule. A channel may be, for example, a television channel, or it may be an Internet-based, multicast stream, or other suitable multimedia feed.

Some users desire specific channels based on their personal interests. For instance, there are news hounds, science nuts, sports fans, sci-fi fans, tearjerker addicts, art connoisseurs, etc. Channel searching by content allows users to create a sort of "Dynamic Favorite Channel List" that caters to such preferences. Such a feature may be useful to all media consumers, but may be particularly useful to persons who are new to a local media distribution system, such as a traveler in a motel room, for example. Searching for channels by content eliminates the need for the user to locate and scan a local channel list for channels he/she guesses would offer the type of programming that the user wants to see at that time.

In various embodiments of the present invention, an interactive media guidance application obtains channel search criteria from the user. For example, in some embodiments, the interactive media guidance application receives user-selected categories chosen from a pre-defined list. In another approach, the interactive media guidance application receives a user-entered keyword into a search box. In yet another approach, the interactive media guidance application receives one or more criteria that were chosen by the user by checking a box or boxes (e.g., from an on-screen menu).

After receiving the channel search criteria from the user, the interactive media guidance application compares channel attribute data to the user-provided channel search criteria. There are several ways by which channel attribute data may be obtained. For example, a "Generate Channel Attributes over Time" function may be used to automatically generate representative channel attribute data based on programs that have aired on the channel during a certain preceding period of time. Another approach uses a "Receive Assigned Channel Attributes" function, which receives channel attribute data manually assigned to each channel by an operator and stored in the interactive media guidance application database. The interactive media guidance application may identify a match when the user-supplied channel search criteria and channel attribute data are exact matches or, in some embodiments, when the matches are similar (e.g., using fuzzy logic).

After identifying matches, the interactive media guidance application displays the channel results using any suitable approach. In one method, the results display may include a streaming video or snapshot depiction of each channel in cells that are graphically arranged as a mosaic. In another embodiment the results display may indicate the channels and provide listings for a given period of time. In yet another embodiment, the results display may be a selectable arrangement (e.g., list) of channels from which the user can link to the current programming for each channel.

BRIEF DESCRIPTION OF THE DRAWINGS

The above and other features of the present invention, its nature and various advantages will be more apparent upon consideration of the following detailed description, taken in conjunction with the accompanying drawings in which:

FIGS. 10a and 10b show two illustrative displays in which search results are displayed for search criterion (FIG. 10a) and listings are displayed for a selected channel (FIG. 10b) in accordance with one embodiment of the present invention;

DETAILED DESCRIPTION

Figure 1:
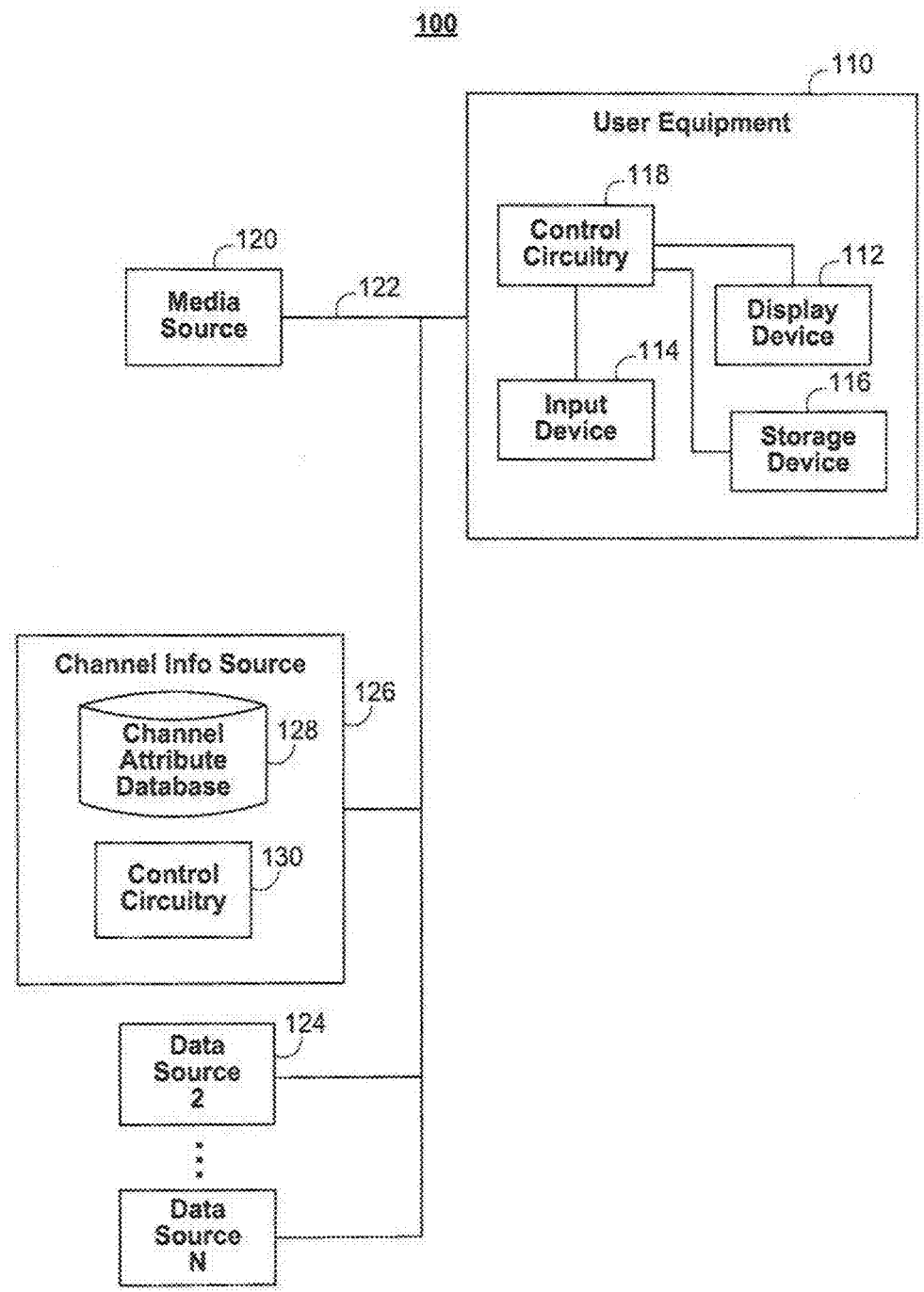
FIG. 1 is a diagram of an illustrative interactive media guidance application system in accordance with an embodiment of the present invention.

FIG. 1 shows an illustrative interactive media guidance application system 100 in accordance with an embodiment of the present invention. User equipment 110 receives content in the form of signals from media source 120 over communications path 122. In practice there may be multiple media sources 120 and user equipment 110, but only one of each has been shown in FIG. 1 to avoid over-complicating the drawing.

Media source 120 may be any suitable media source such as, for example, a cable system headend, satellite media distribution facility, media broadcast facility, on-demand server (e.g., VOD server), game service provider (e.g., for online gaming), Internet service provider (e.g., for providing Web-sites), an ordered list provider (e.g., for providing playlists), or any other suitable facility or system for originating or distributing content. Media source 120 may be configured to transmit signals over any suitable communications path 122 including, for example, a satellite path, a fiber-optic path, a cable path, an Internet path, or any other suitable wired or wireless path. The signals may carry any suitable media content such as, for example, television programs, games, music, news, and/or web services. In some embodiments, media source 120 may include control circuitry for executing the instructions of an interactive media guidance application such as, for example, a client/server or online interactive media guidance application.

Each media source 120 transmits media in real time or near real-time fashion as one or more channels. For example, a media source 120 may transmit one or more channels of television programming. As another example, a media source 120 may be a website that multicasts video content according to a schedule (e.g., as opposed to on-demand) over the Internet.

User equipment 110 may include any equipment suitable for providing an interactive media experience. User equipment 110 may include television equipment such as a television, set-top box, recording device (e.g., digital video recorder), video player, user input device (e.g., remote control, keyboard, mouse, touch pad, touch screen and/or voice recognition interface), or any other device suitable for providing an interactive media experience. For example, user equipment 110 may include a DCT 2000, 2500, 5100, 6208 or 6412 set-top box provided by Motorola, Inc. In some embodiments, user equipment 110 may include computer equipment, such as a personal computer with a television card (PCTV) or an Open Cable Unidirectional Receiver (OCUR) plug-in card and optionally a security access card suitable for secure delivery of content. In some embodiments, user equipment 110 may include a gaming system, a portable electronic device, such as a portable DVD player, a portable gaming device, a cellular telephone, a PDA, a music player (e.g., MP3 player), or any other suitable portable or fixed device.

User equipment 110 may include a network (not shown) that interconnects various elements of user equipment 110 within, for example, a household.

In the example of FIG. 1, user equipment 110 includes at least control circuitry 118, display device 112, storage device 116 and user input device 114, which may be implemented as separate devices or as a single device. An interactive media guidance application, such as an interactive television program guide, may be implemented on user equipment 110 to control the display, on display device 112, of the media transmitted by media source 120 over path 122 and to provide interactive media guidance application features.

The media that may be played by user equipment 110 may vary widely. In fact, many different types of media may be played by user equipment 110. Many different types of media may be available because each media type may be unique in a technical sense (e.g., a particular technical implementation is required to play a particular type of media, for example, MPEG4 or MPEG2 video) or is considered unique in a definitional sense (e.g., a video-on-demand program may be considered a different type of media than a broadcast program). The different types of media may be classified generally or to a desired degree of specificity. For example, general classifications of media types may include television media, music media, and audio and/or video media. Within each general media type, more specific and different media types are available. Television media may include, for example, broadcast television programming, switched broadcast/groupcast/unicast programming, recorded television programming, video-on-demand (VOD) programming, near video-on-demand (NVOD) programming, pay-per-view programming, satellite television programming, and streaming video programming. Recorded television programming may be a recording of another type of television programming. Recorded television programs may be stored locally on user equipment 110 or remotely on networked user equipment (not shown). Recorded television programming may also be stored on a remote network video recorder server (such as media source 120 or similar remote server). Music media may include, for example, MP3 files, WAV files, MIDI files, AAC, real media, Dolby digital, or other suitable format with which music can be compressed, distributed and stored on user device 110.

Display device 112 may be any suitable display device such as, for example, a television monitor, a computer monitor, or a display incorporated in user equipment 110 (e.g., a cellular telephone or music player display). Display device 112 may also be configured to provide for the output of audio.

Control circuitry 118 is adapted to receive user inputs from input device 114 and execute the instructions of the interactive media guidance application. Control circuitry 118 may include one or more tuners (e.g., analog or digital tuners), encoders and decoders, processors (e.g., Motorola 68000 or MIPS family processors), memory (e.g., RAM and hard disks), communications circuitry (e.g., cable modem circuitry), input/output circuitry (e.g., graphics circuitry), connections to the various devices of user equipment 110, and any other suitable component for providing analog or digital media programming, program recording and playback, and interactive media guidance features. In some embodiments, control circuitry 118 may be included as part of one of the devices of user equipment 110 such as, for example, part of display 112 or any other device (e.g., a set-top box, television and video player).

User equipment 110 may include a storage device 116 such as, for example, memory or hard-drive (e.g., digital video recorder). Only one such storage device is shown to avoid overcrowding the figure, though it is understood that additional storage devices may be used as desired. Storage device 116 may store data (e.g., channel content) and media (e.g., recorded assets). In another embodiment (not shown) user equipment 110 may be able to access a storage device located at a remote site and store data and/or media at that remote storage device. Such a remote storage device may be referred to herein as a networked storage device, a remote storage device, or a networked digital video recorder.

In some embodiments, the interactive media guidance application may provide features to the user with a client/server approach. For example, data pertaining to channel content may be provided to the server, which may store the data from the client. When the client performs a channels-by-content search, it may retrieve the channel content data from the server, or alternatively, the client may request the final list of channels from the server. There may be one server for each instance of user equipment 110, one for multiple instances of user equipment 110, or a single server may serve as a proxy for each instance of user equipment 110.

Any suitable number of users may have equipment, such as user equipment 110, connected to media source 120 and data source 124. But for clarity of illustration, the equipment of only a single user is shown. The equipment of the plurality of users may be connected to media source 120 and data source 124 using a cable television network, a local area network (LAN), a satellite network, a fiber optic network, a wireless network, or any other suitable means. In some embodiments, the equipment of the plurality of users may be connected to each other using any suitable means.

User equipment 110 may receive interactive media guidance application data from one or more data sources 124. Data sources 124 may provide data for a particular type of content or for a particular application. For example, one data source 124 may provide data for non-on-demand assets (e.g., non-pay and pay-per-view programs), and another may provide data for on-demand assets (e.g., VOD programs). Or, for example, a single data source may provide both of these types of data. For example, one data source 124 may provide data for an interactive television program guide. Another data source 124 may provide data for series playlists. Another data source 124 may, for example, provide data for another interactive application (e.g., a home shopping application). In some embodiments, data sources 124 may provide data to the interactive media guidance application using a client/server approach. There may be one server per data source, one for all sources or, in some embodiments, a single server may communicate as a proxy between user equipment 110 and various data sources 124. In some embodiments, data sources 124 may provide data as an online interactive media guidance application. In such embodiments, data source 124 may include control circuitry for executing the instructions of the online media guidance application.

Channel info source 126 shows one particular example of a data source for various embodiments of the present invention, which aids in searching channels by content. Data source 126 includes a channel attribute database 128 and control circuitry 130 (which may include any suitable processor, memory, I/O circuitry, and communications circuitry). Control circuitry 130 directs the storage and transfer of channel attribute data. The channel attribute data defines the content of a channel. The interactive media guidance application implemented on user equipment 110, whose instructions are processed by control circuitry 118, compares this information during the channels-by-content search against user-entered channel search criteria.

Channel attribute data may be generated in a number of ways. In some approaches, an operator of data source 126 manually assigns channel attribute data to each channel. Such an assignment may be based on the editorial judgment of the operator. In other embodiments, control circuitry 130 runs a process which examines program identifiers of media for a channel (e.g., titles, and genre information) over time, and based on suitable criteria (e.g., frequency) generates channel attribute data for the channel. For example, assume that the program identifiers for media on a television demonstrates 75% of the programs on that channel are sports programs. Control circuitry 130 may assign a category of "sports" to the channel. In some embodiments a combination of these approaches are used. It should also be noted that in some embodiments the interactive media guidance application automatically generates channel attribute data.

FIG. 1 shows media source 120 and data sources 124 as separate elements. In practice, their functionality may be combined and provided from a single system at a single facility, or multiple systems at multiple facilities. For example, one media source 120 and data source 124 may be combined to provide VOD content and associated VOD data.

For the purposes of clarity, the following discussion may sometimes describe an embodiment in which the interactive media guidance application is an interactive program guide. It will be understood, however, that the following discussion and the features discussed may be applied to any interactive media guidance application.

Figure 2:
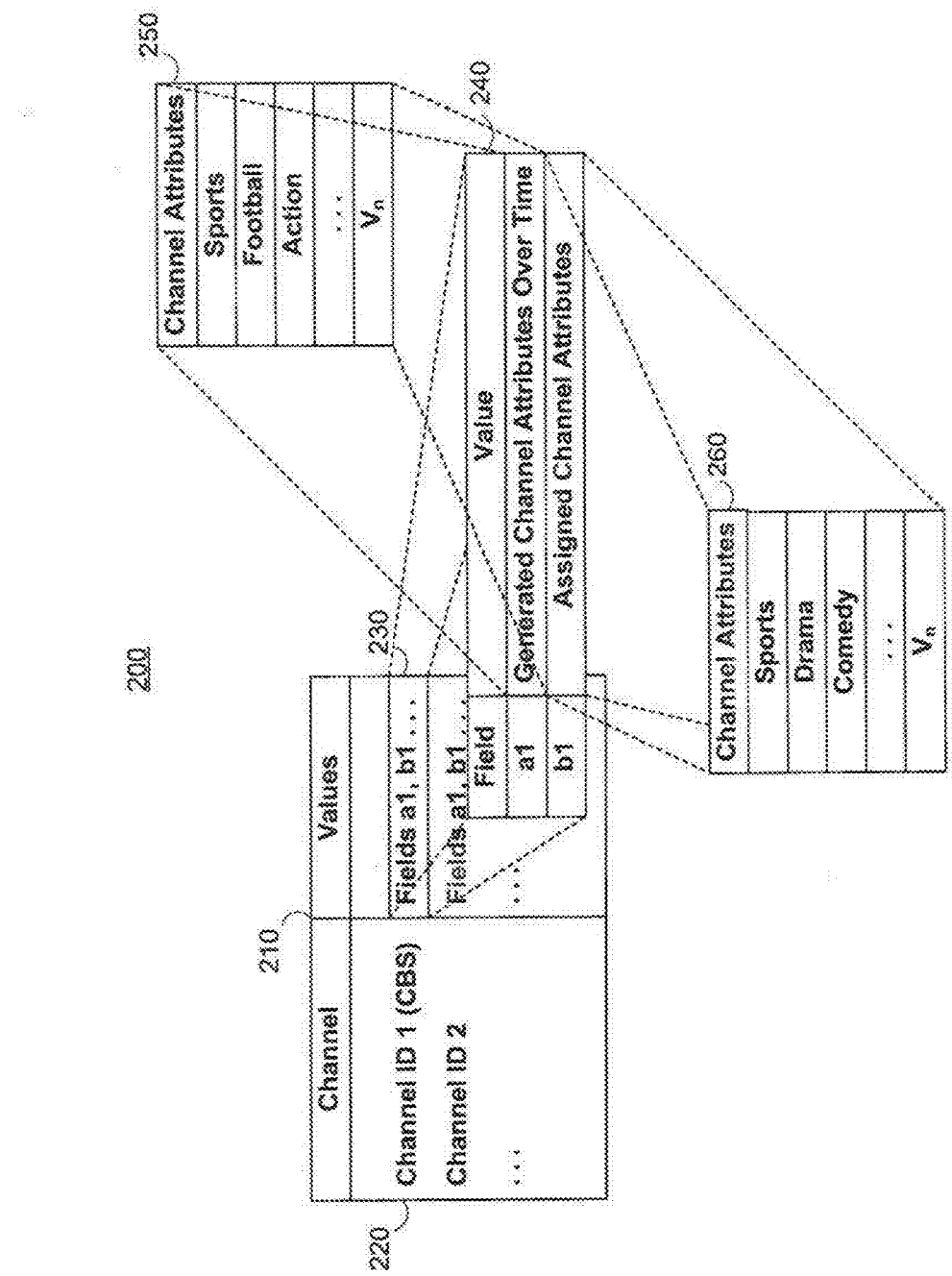
FIG. 2 is a diagram of an illustrative channel information data structure in accordance with an embodiment of the present invention.

FIG. 2 shows a diagram 200 illustrating one possible data structure for storing channel attribute data in the channel attribute database 128 of data source 126 (FIG. 1). The main table 210 has two parts, channel ID 220 and corresponding fields 230. One illustrative example shown in fields 230 is that Channel ID 1 is CBS. Each Channel ID has an unlimited amount of associated fields depicted by field 230. In this example, there are two associated fields for the Channel ID shown by the first sub-chart 240. The two fields are "a1" with associated value "Generated Channel Attributes over Time" and "b1" with associated value "Assigned Channel Attributes." These two values indicate two illustrative ways that channel attribute data can be generated or assigned.

The next table 250 illustrates a partial list of channel attribute data that was generated from a "Generated Channel Attributes over Time" process run by channel information source 126 or an interactive media guidance application implemented on user equipment 110. Here, the first three attributes associated with CBS are shown: sports, football, and action.

Table 260 illustrates a partial list of channel attribute data manually assigned to CBS. Three illustrative "Assigned Channel Attributes" are shown: sports, drama, and comedy. Note that this list partially overlaps with the "Generated Channel Attributes over Time" list. Though overlap is likely, it would not necessarily always be the case.

Figure 3:
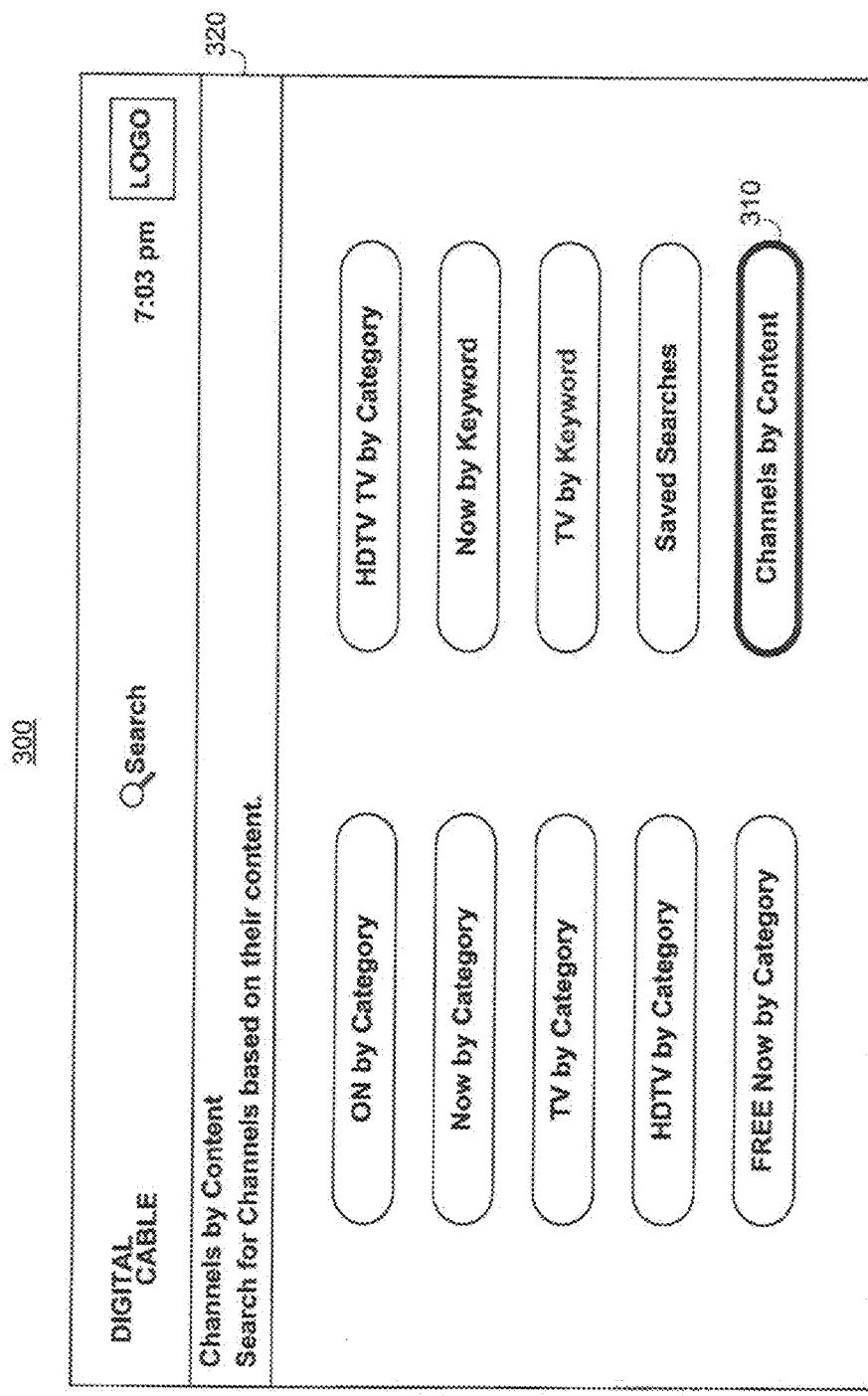
FIG. 3 shows an illustrative main search display screen in accordance with one embodiment of the present invention.

FIG. 3 shows an illustrative search display 300 from which the interactive media guidance application presents the user with ways to search for and view programming. "Channels-by-Content" button 310 is one illustrative user interface element that the interactive media guidance application may present to the user as a means for allowing the user to choose to search for a list of channels by content. Information area 320 informs the user about the functionality of button 310 when it is highlighted. As shown in the figure, button 310 is highlighted, indicating that it has been highlighted by the user (for example, by the user navigating a highlight region to the button using arrow keys using a remote control). FIG. 3 is only one illustrative approach, as the interactive media guidance application may present the user with other ways to search for channels by content. For example, there may be a button on a user's remote control (not shown) that directly invokes the feature using a single key press.

Figure 4:
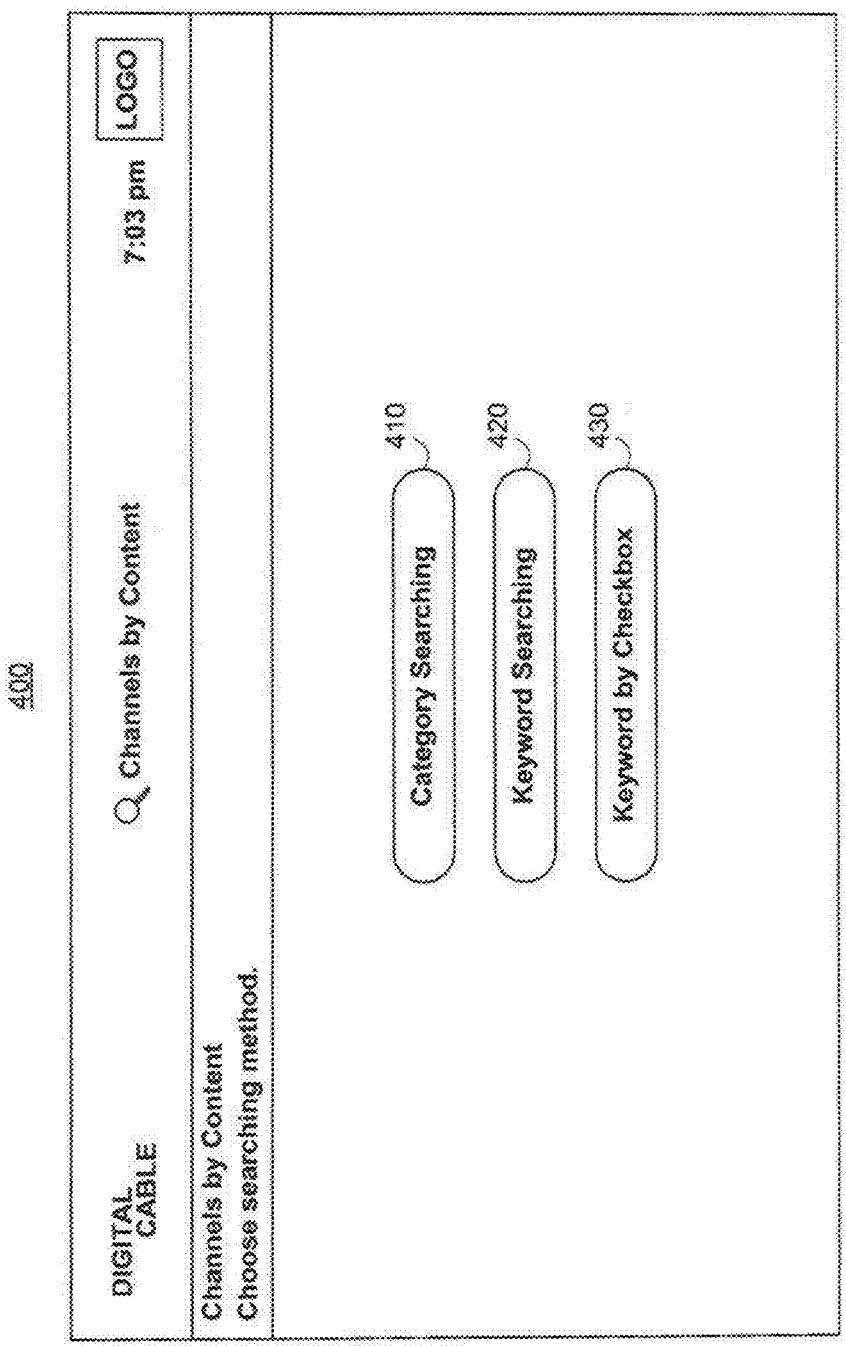
FIG. 4 shows an illustrative display of exemplary channel search options in accordance with one embodiment of the present invention.

In response to the user invoking the channels-by-content search function, such as by selecting button 310 of FIG. 3, the interactive media guidance application may provide a search criteria entry display, or may allow the user to select from one of a plurality of search criteria methods. FIG. 4 shows an illustrative display 400 that provides the user three possible search methods: category searching 410, keyword searching 420, and keyword by checkbox 430. These features are explained below in connection with FIGS. 5, 6, and 7. These are merely depictive of possible search methods and do not present an exhaustive list.

Figure 5A:
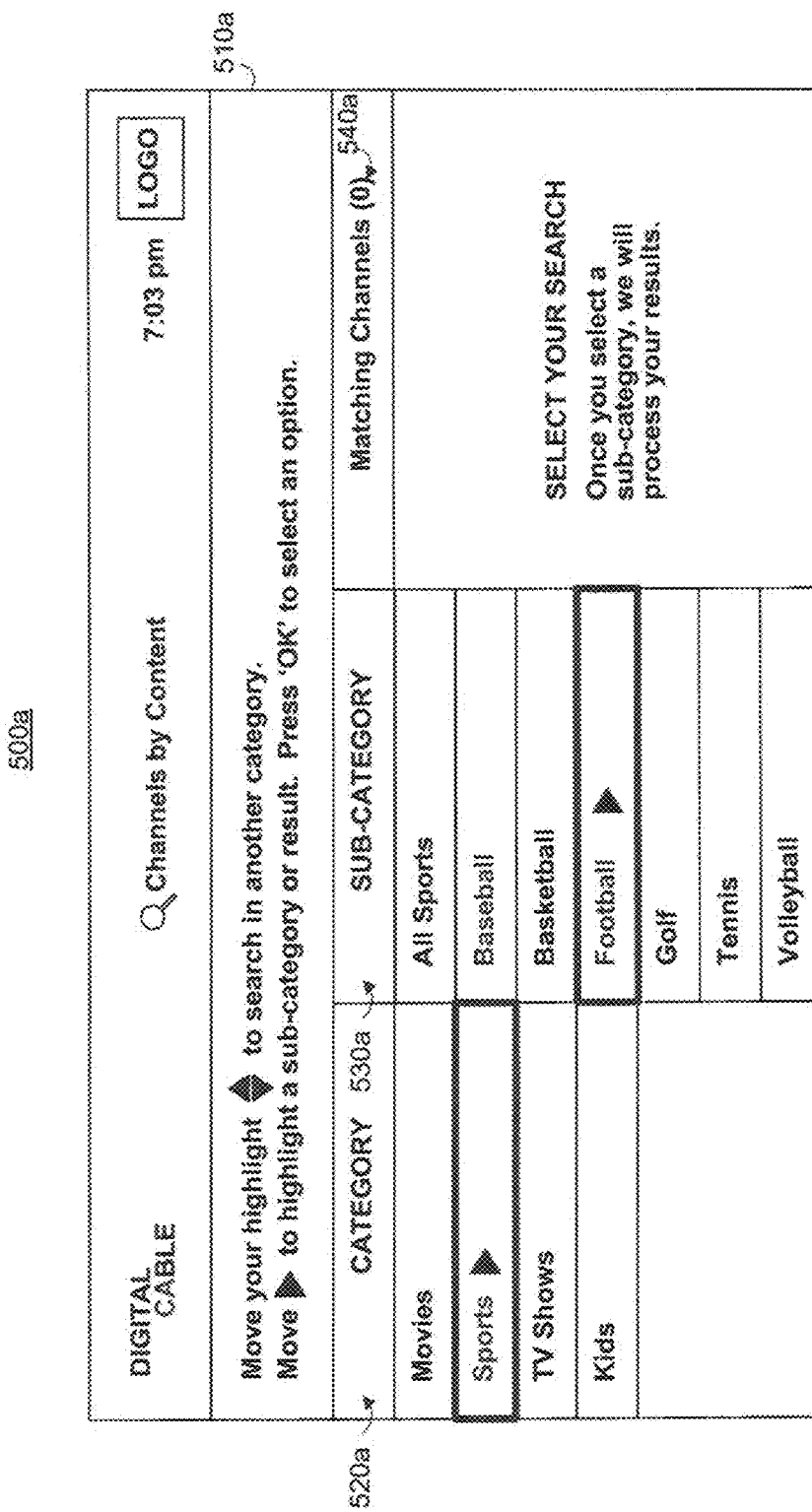
FIGS. 5a and 5b show two illustrative category searching displays in accordance with one embodiment of the present invention.
Figure 5B:
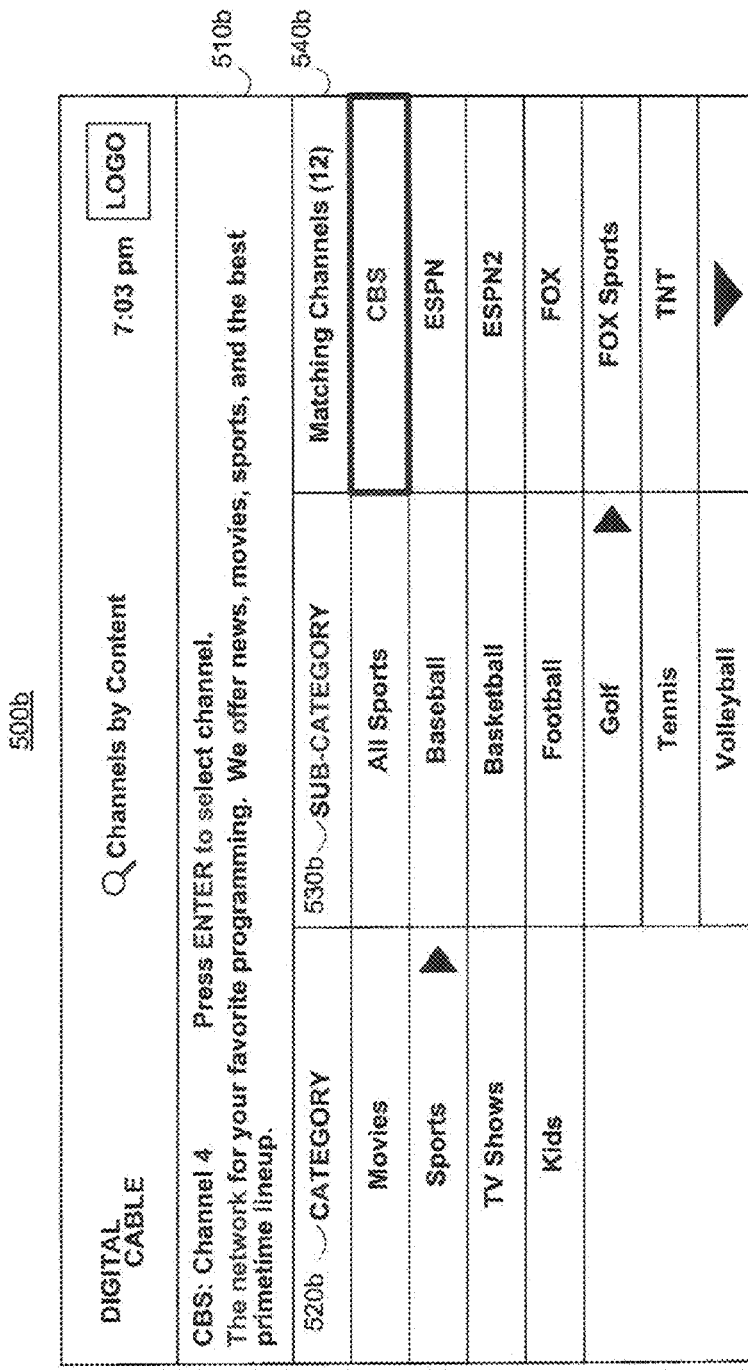

FIGS. 5*a* and 5*b* are two illustrative category searching displays 500*a* and 500*b*. In this search criteria entry mode, the user selects categories and sub-categories from lists. Help area 510*a* explains how the user should interact with a search screen of this type. A user uses the up and down arrows on the user's remote to scroll up and down the list. The right arrow makes the user's selection and presents the user with either results or a sub-list. The left arrow cancels the user's most recent selection.

"Category" column 520a shows an illustrative list of possible broad categories the interactive media guidance application may present to the user. This illustrative list includes four possible categories. In this display, the user has selected sports by scrolling to highlight sports and selecting the right arrow. This has brought up "Sub-Category" list 530a. This list presents the user with a more specific list of options, in this illustrative case the list of options concerns different types of sports because the user selected "sports" from the "Category" column 520a. The user has highlighted the sub-category "Football," but has not selected it. The "Results" column 540a contains instructions for the user to enter a further selection. The user has not entered enough information to be presented with a final channels-by-content result list.

FIG. 5b represents how display 500a would look after the user made the user's next selection if that user's selection were football. In response, the interactive media guidance application searches channel attribute database 128 (FIG. 1) and presents the user with a list of matching channels in the "Results" column 540b. In this particular illustrative case there were twelve channels that matched the user's channel search criteria. Only the first seven channels in the list are displayed. The user may access the remainder of the results by scrolling down through the list. Currently, the user has selected CBS. Help area 510b now explains to the user how to tune to CBS and also offers a brief description of CBS's general programming.

Figure 6A:
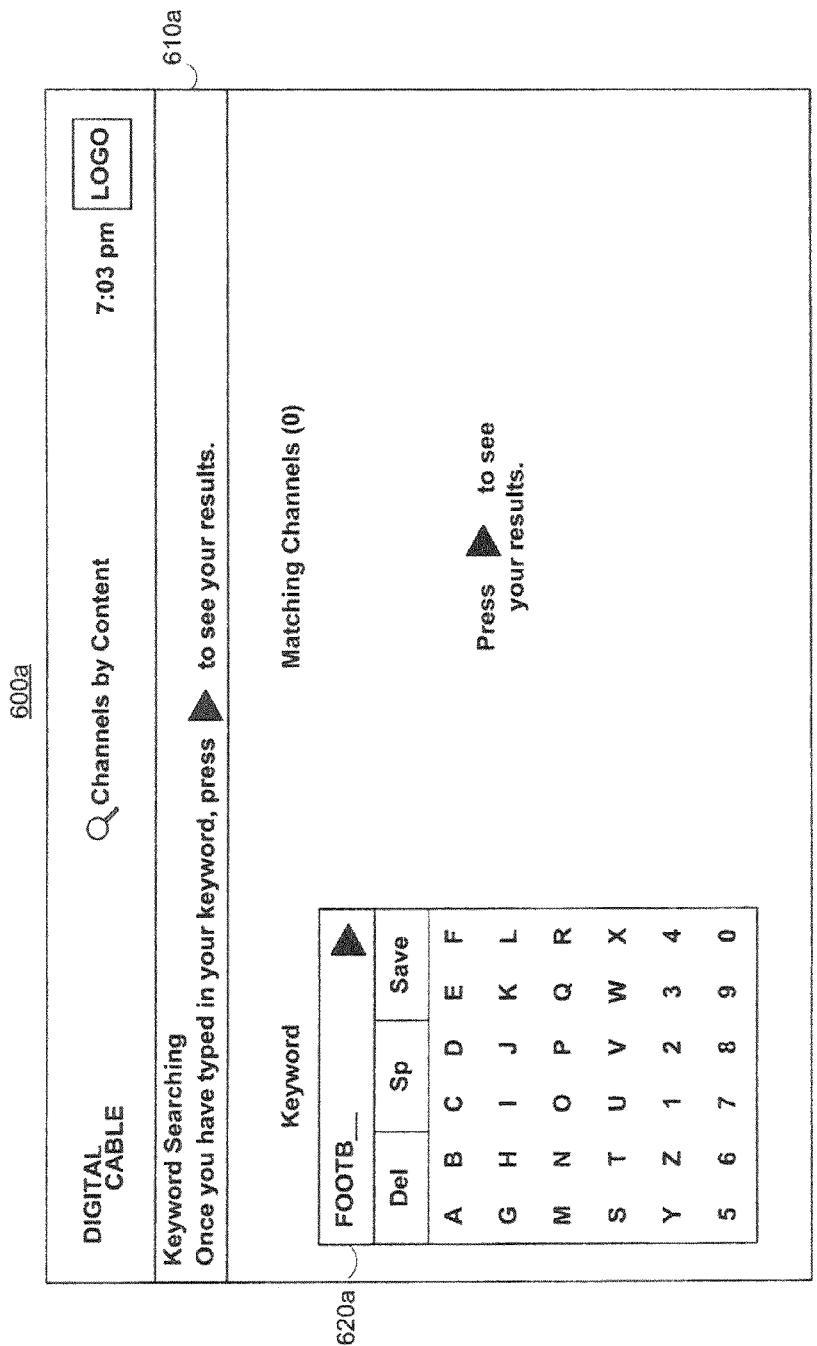
FIGS. 6a and 6b show two illustrative keyword searching displays in accordance with one embodiment of the present invention.
Figure 6B:
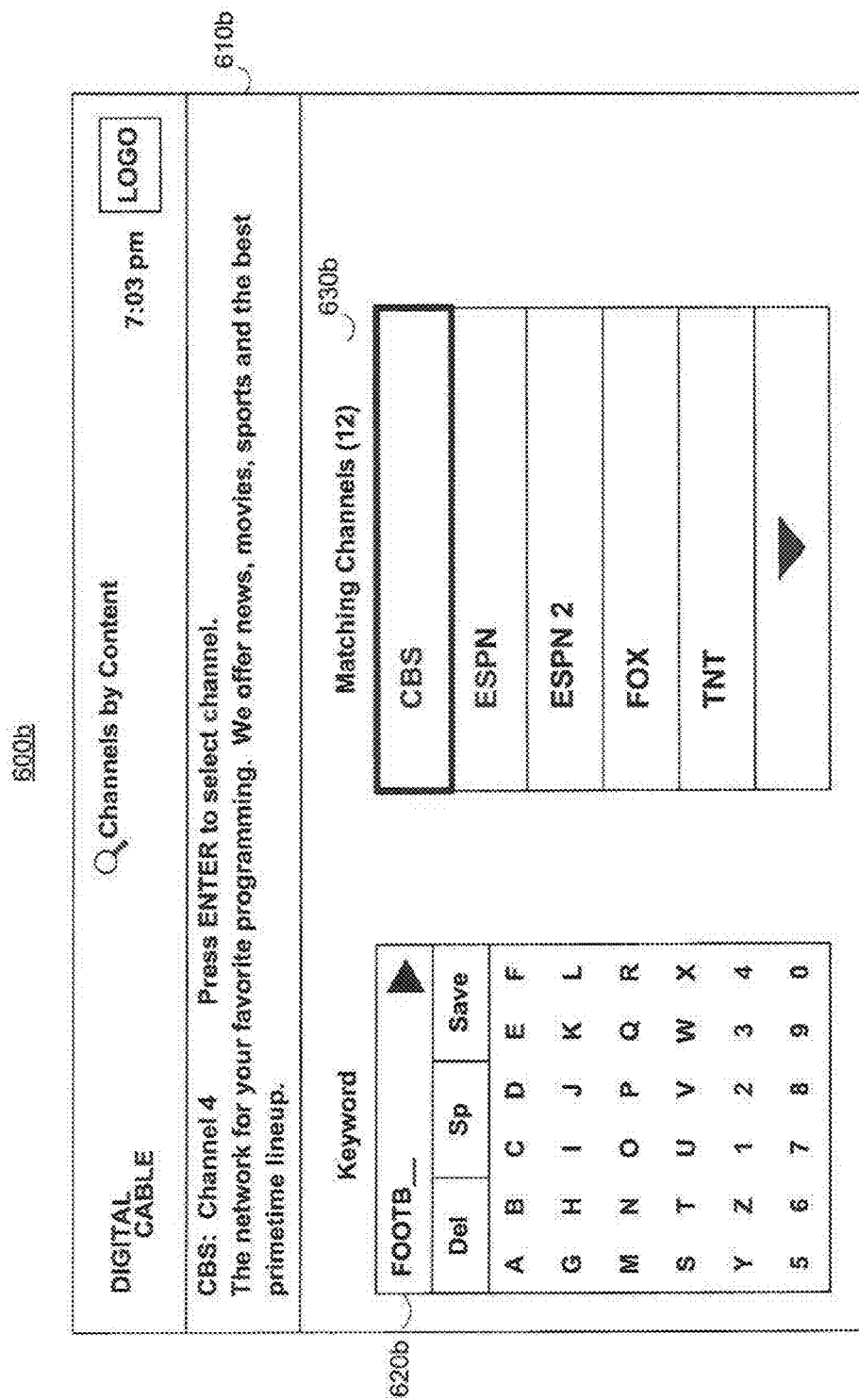

FIGS. 6a and 6b are two illustrative keyword entry displays. In this search criteria entry mode, the user enters keywords letter by letter. The user navigates through the keypad 620a to select a letter and presses enter to add the letter to the keyword. The use of an on-screen keyboard is only illustrative, as it is suitable for limited user input devices, such as remote controls. In other embodiments, other interface elements may be used. One example would be a simple text entry field when the user input device is a keyboard. Any suitable text entry interface may be used.

In this illustrative display, the user has entered five letters, FOOTB (partially entering "FOOTBALL"). In some embodiments the interactive media guidance application may provide a list of potential keywords matching the entered letters as part of an autocomplete function (not shown). In response to the user entering a partial or complete keyword, the interactive media guidance application searches the channel attribute database 128 (FIG. 1) for matching channels. FIG. 6b shows an illustrative results list 630b having twelve matches, although the user can only currently see five. To access the remaining matches, the user may scroll down the list. Because CBS is the current highlighted selection, help area 610b offers instructions on how to tune to CBS along with a brief description of CBS's general programming.

Figure 7:
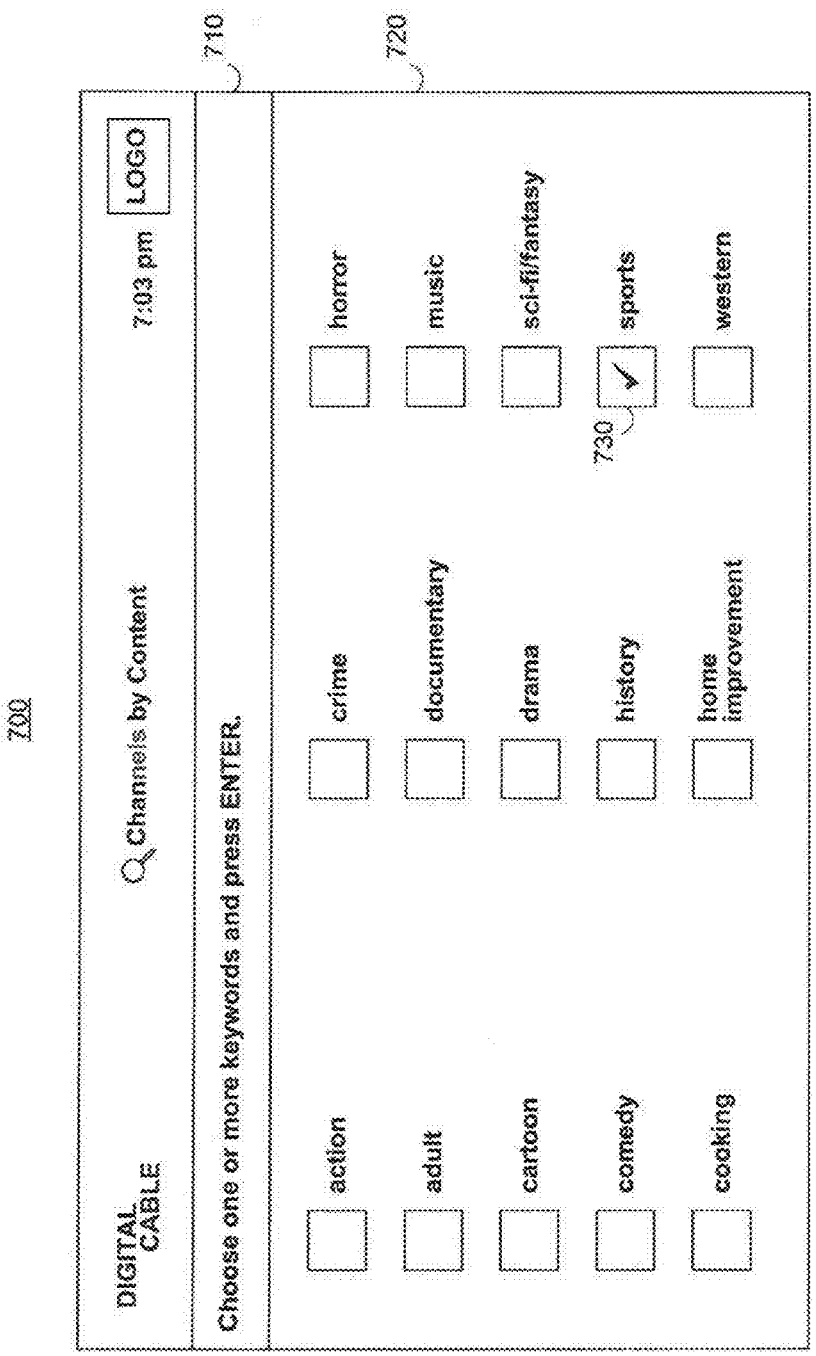
FIG. 7 shows an illustrative keyword searching display in accordance with one embodiment of the present invention.

FIG. 7 is an illustrative keyword-by-checkbox display 700. In this search criteria entry mode, the interactive media guidance application allows a user to input channel search criteria by merely checking boxes associated with a predefined list of channel attributes 720. Help area 710 explains to the user how to make selections and submit them to receive results.

The user may select one or more channel search criteria. Multiple channel search criteria may be processed using different operators, including AND and OR. The interactive media guidance application may have the operator pre-determined or the user may be presented with an option of using AND or OR (not shown). To illustrate, assume the user selects "action" and "sports" and presses ENTER. If the interactive media guidance application is set to use the AND operator, or if the user selects to use the AND operator, the user would only be presented with those channels whose channel attribute data matches both "action" and "sports." This is the more restrictive form of searching. If, instead, the interactive media guidance application is set to use the OR operator, or if the user selects to use the OR operator, the user would be presented with all channels whose channel attribute data matches "action" and all channels whose channel attribute data matches "sports." The user would, in most instances, be presented with a larger, but less tailored, set of results if the OR operator were used.

In the example of display 700, the user has selected "sports" in the checkbox field 730. In response to the user pressing ENTER, the interactive media guidance application will search the channel attribute database 128 (FIG. 1) for matching channels and display the results. Alternatively, and not shown in FIG. 7, the interactive media guidance application may also present the user with a sub-checkbox field wherein the user makes a more specific selection. If the user selected "sports," the user may be presented with a number of checkboxes representing different types of sports. Whether or not the user is presented with a list of channels or asked for more specific criteria could be pre-set in the interactive media guidance application or could be chosen by the user. For example, if the number of results exceeds a pre-set value, the interactive media guidance application may automatically be programmed to request more detailed criteria from the user so that the interactive media guidance application may narrow the channel results list.

FIGS. 8, 9, 10a and 10b are illustrative results displays. The interactive media guidance application may present results in these formats as part of any channels-by-content search. For example, the interactive media guidance application may use such display arrangements when presenting results for a channels-by-content search in which the user selected keywords (such as in the approach illustrated by FIG. 7). Or, the interactive media guidance application may use such displays when providing results for searches in which keywords were entered using the approach of FIG. 5a, or in which categories were selected using the approach of FIG. 6a, in lieu of the results displays of FIGS. 5b and 6b, respectively.

Figure 8:
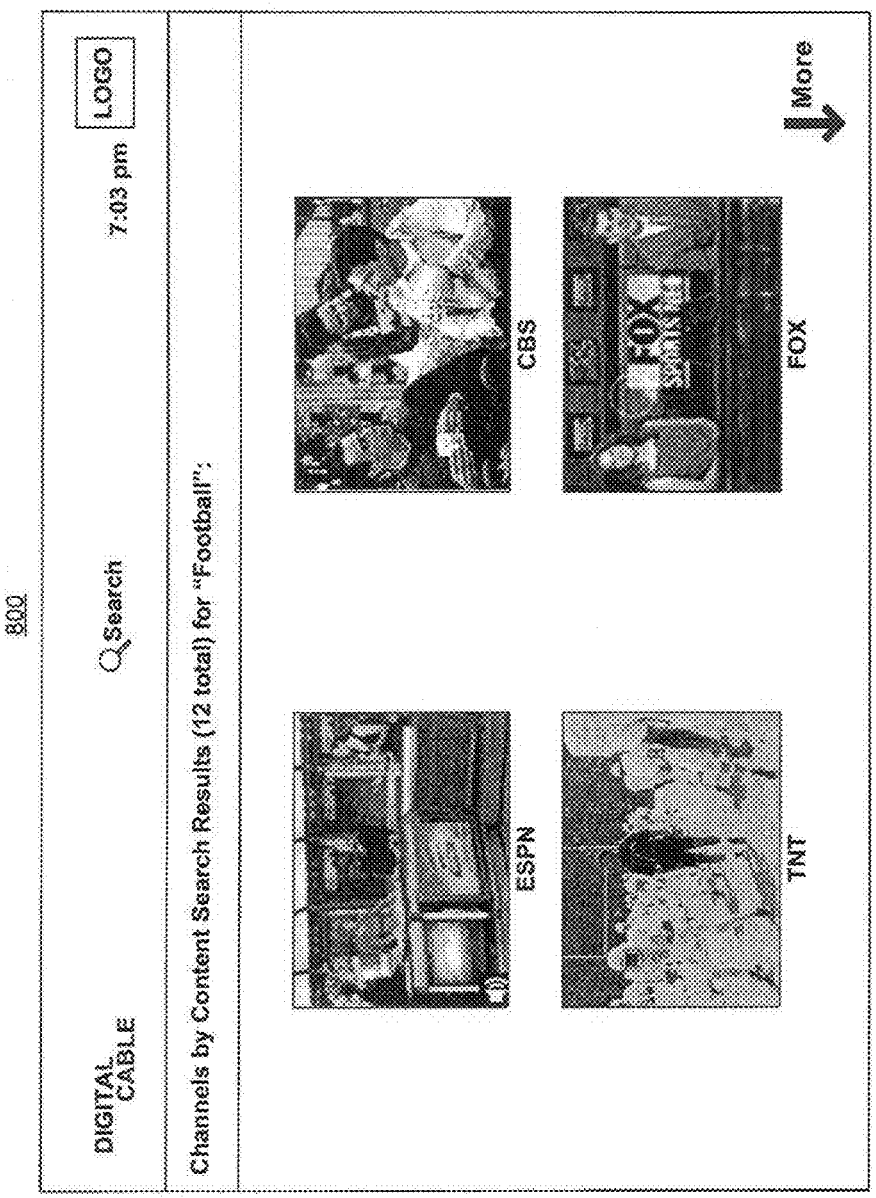
FIG. 8 shows an illustrative mosaic search results display in accordance with one embodiment of the present invention.

FIG. 8 shows an illustrative mosaic display 800 in which results are represented in a plurality of cells. In the example of FIG. 8, there are twelve channels in the results list that match the user's channel search criteria (e.g., "Football.") Results display 800 shows four results (ESPN, CBS, TNT, and FOX), and the user may scroll down to see the remaining eight. In this example, the user highlights the channel to which the user wishes to tune and presses ENTER.

There are multiple suitable methods to indicate results. In some embodiments, the cells include currently-streamed or broadcast video for each channel. But this method would require a tuner (or other circuitry) for each channel in the result. To solve this issue, the user may be able to see streaming video for the particular channel that the user has currently highlighted. For example, in display 800 if the user had highlighted CBS with the user's remote control (not shown) the user would see a streaming video of the current program Everybody Loves Raymond.

In other embodiments, the interactive media guidance application uses a snapshot of the current programming that is showing on each channel (such as by tuning to each of the results sequentially and storing a frame of video from each). In the example of FIG. 8, the interactive media guidance application would have determined that Everybody Loves Raymond was showing on CBS and then obtained a freeze-frame of Everybody Loves Raymond to display to the user. Additionally or alternatively, if others are available, additional channels may be displayed live or a round robin frame capture update of channels may be implemented. Additionally, the interactive media guidance application could determine that Everybody Loves Raymond is showing on CBS and use a stock photograph from a database that represents the program. Such a photograph would be of the type used by CBS in promotional materials for Everybody Loves Raymond. Such a database would include a photograph associated with every program in the current cable programming lineup. Furthermore, a mix of stock photographs and current screen shots could be used in yet another embodiment.

CBS shows NFL and college football games on a regular basis. But note that the current programming on a channel in the search results list does not necessarily match the search criteria. For example, while Everybody Loves Raymond does not satisfy a search for "Football" in and of itself, CBS still satisfies the search criteria if there had been, within a certain preceding time frame, programming on CBS including content associated with football.

Figure 9:
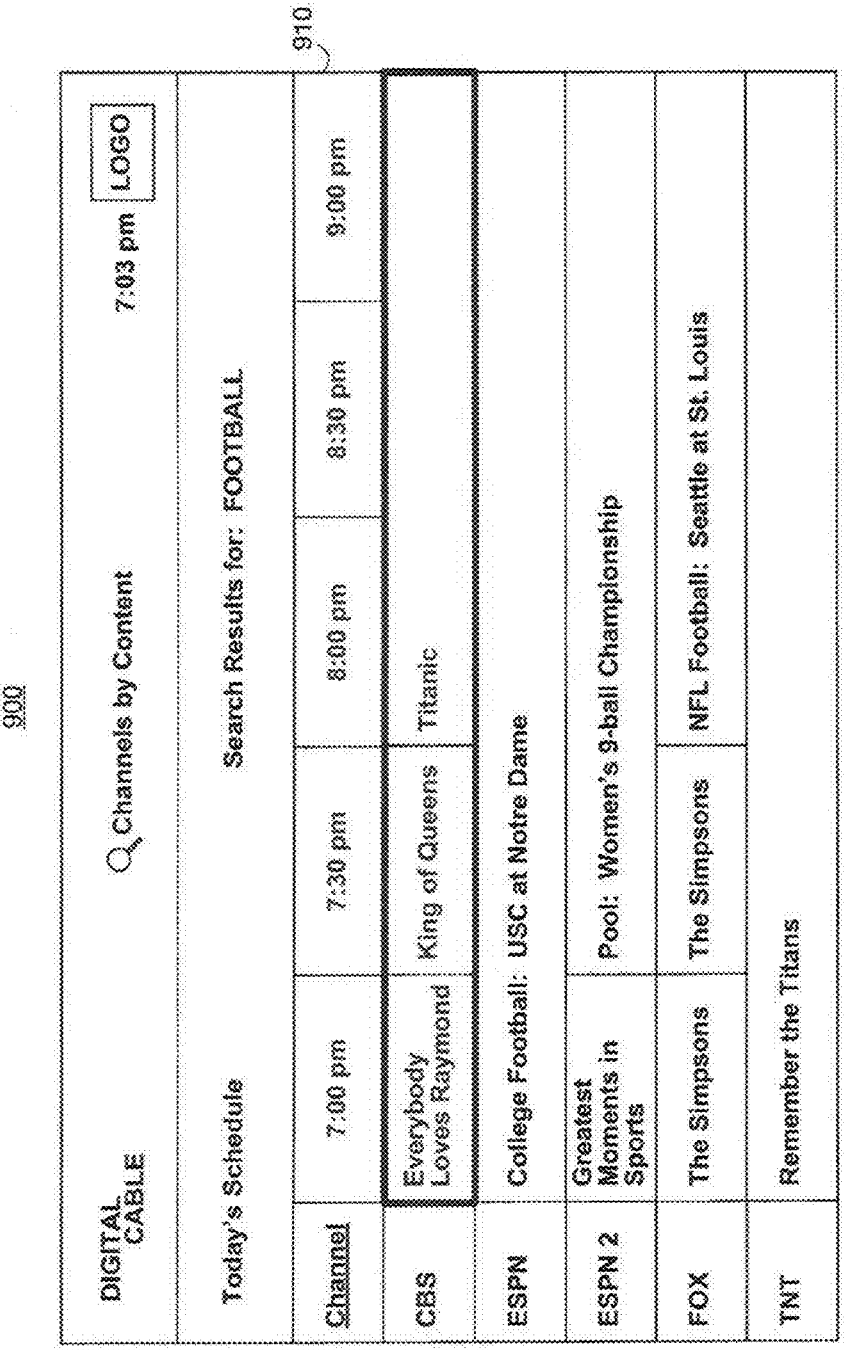
FIG. 9 shows an illustrative search results display having channel indicators and program listings for the indicated channels in accordance with one embodiment of the present invention.

FIG. 9 shows another illustrative search results display. Display 900 is a grid of channels matching the user's channel search criteria (e.g., "Football"). In this example, 2.5 hours 910 of the current programming is shown for those channels that matched the user's channel search criteria. The interactive media application allows the user to scroll through the grid to other channels, navigate to programming on the channels for other time slots, and tune to a channel by selecting the channel and pressing ENTER. Here, the user has selected CBS as depicted by the highlighting.

Figure 10A:
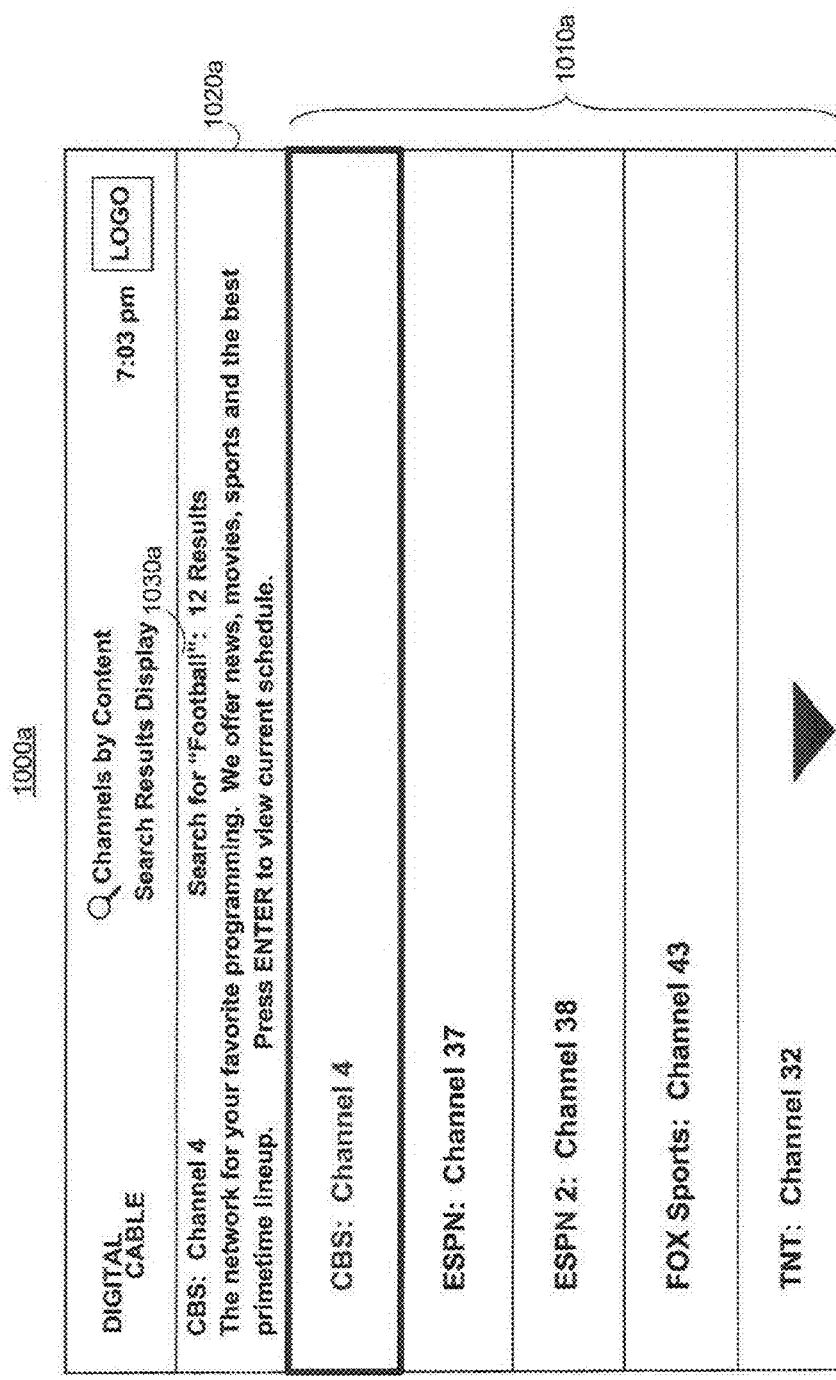

FIGS. 10a and 10b are two displays 1000a and 1000b illustrating additional approaches the interactive media guidance application may use to display search results to the user. In display 1000a the interactive media guidance application presents the user with a list of channels 1010a that match the user-supplied channel search criteria. Here there are twelve total channels in the results list. Five channels are shown. The user may scroll down to view the remaining seven channels. The user currently has CBS highlighted, so the interactive media guidance application displays a short description of CBS's general programming in the instruction window 1020a. Having highlighted CBS, the user simply presses ENTER to view the channel's current schedule.

Display 1000b represents the current CBS schedule 1010b that the interactive media guidance application would present to the user if the user were to select CBS in display 1000a (FIG. 10a). The instruction window 1020b now tells the user to press ENTER to tune to CBS. The user would press BACK, ESCAPE, or an equivalent key to return to the previous screen and select a different channel.

Figure 11:
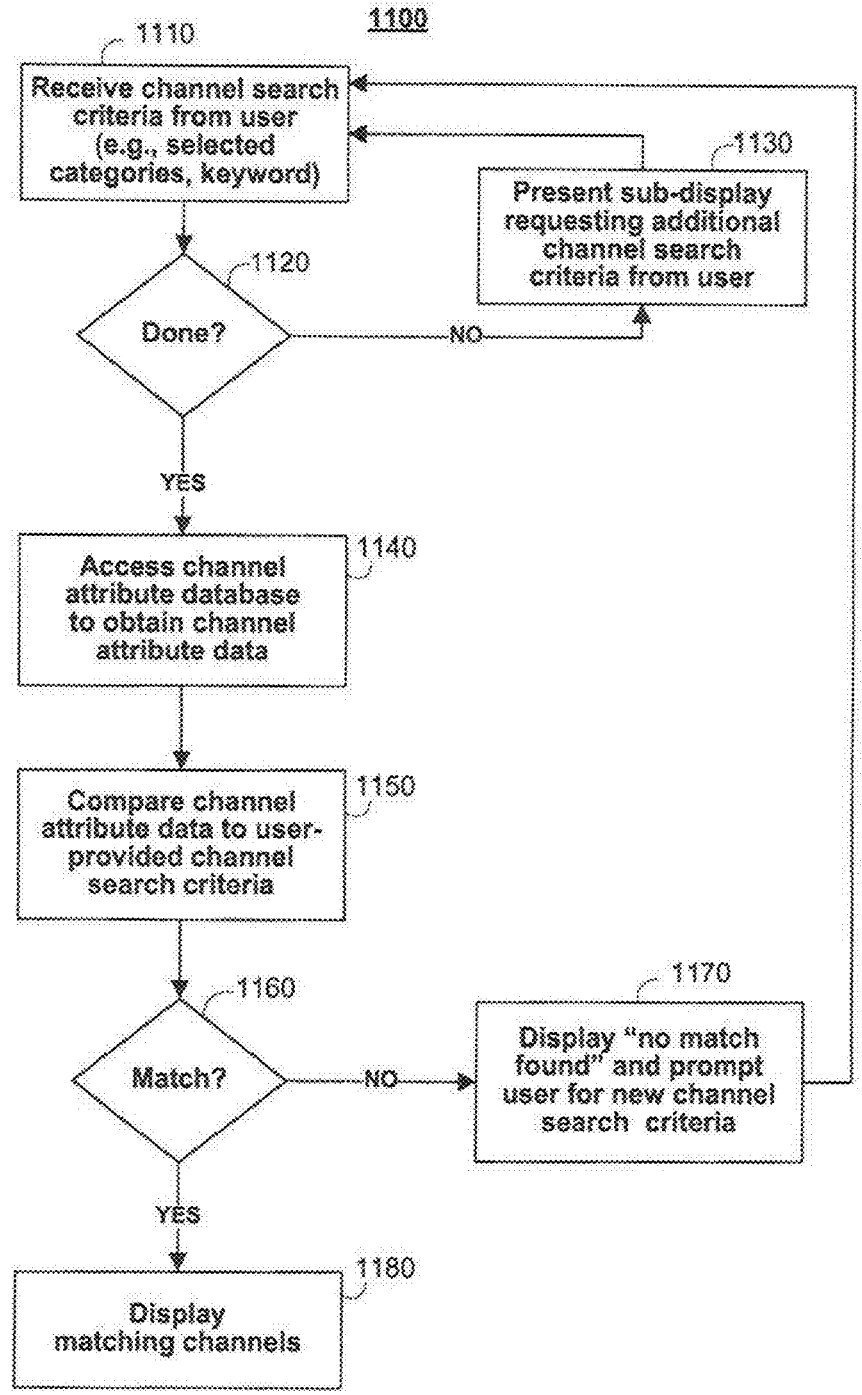
FIG. 11 is a flowchart of an illustrative process for channel searching in accordance with one embodiment of the present invention.

FIG. 11 shows a flowchart 1100 of an illustrative process for searching for channels by content. At step 1110 the interactive media guidance application receives channel search criteria from the user with which to perform the channels-by-content search. The interactive media guidance application may receive user criteria using any suitable approach, including those shown, for example, in FIG. 4: Category Searching 410 demonstrated in FIG. 5, Keyword Searching 420 demonstrated in FIG. 6, and Keyword by Checkbox 430 demonstrated in FIG. 7.

In step 1120, the interactive media guidance application then determines whether the user has entered the final criteria. This determination can be made in a multitude of ways. For example, the interactive media guidance application may determine that there are too many hits based on some predetermined threshold, or, the guide may use a multi-step process for receiving search criteria. In response to determining it has not received the final user criteria, the interactive media guidance application may, for example, in step 1130 present the user with a sub-display of selectable genres, or it may simply prompt the user for additional channel search criteria. Presenting the user with a sub-display is illustrated in the sub-category column 530a (FIG. 5a). The interactive media guidance application then receives the additional user criteria 1110 and repeats the decision-making step 1120 until it determines that it has received the final user criteria.

Once the interactive media guidance application determines it has received the final user criteria, it continues to step 1140 and accesses the channel attribute database 128 (FIG. 1). Specifically, the interactive media guidance application obtains channel attribute data. This may be accomplished using any suitable approach. In some embodiments, for example, the interactive media guidance application obtains channel attributes for all channels, then proceeds to steps 1150 and 1160. For other embodiments, the interactive media guidance application performs steps 1140 through 1160 iteratively, channel by channel.

At step 1150, the interactive media guidance application compares the channel attribute data for each channel against the user-supplied channel search criteria received in step 1110. The interactive media guidance application determines at step 1160 whether there has been one or more channel matches. A channel match is made if the interactive media guidance application finds the user-supplied channel search criteria in the channel attribute data for that particular channel. In one approach, a match is also made when user-supplied channel search criteria is similar to one or more channel attributes, referred to herein as "fuzzy matching." If the user-supplied channel search criteria is not present or similar to that channel's associated attribute data, no match is made.

If no matches are made, the interactive media guidance application displays this result to the user and prompts the user to enter new channel search criteria in step 1170. The interactive media guidance application may also present the user with the option to exit without entering new channel search criteria (not shown). The interactive media guidance application then returns to the first step of the process and repeats steps 1110 through 1160.

If a match is made in step 1160, the results are displayed to the user in step 1180. There are multiple methods that the interactive media guidance, application may use to display search results to the user. A few illustrative examples include those shown in FIGS. 8, 9, 10a and 10b along with those figures' associated comments.

Figure 12:
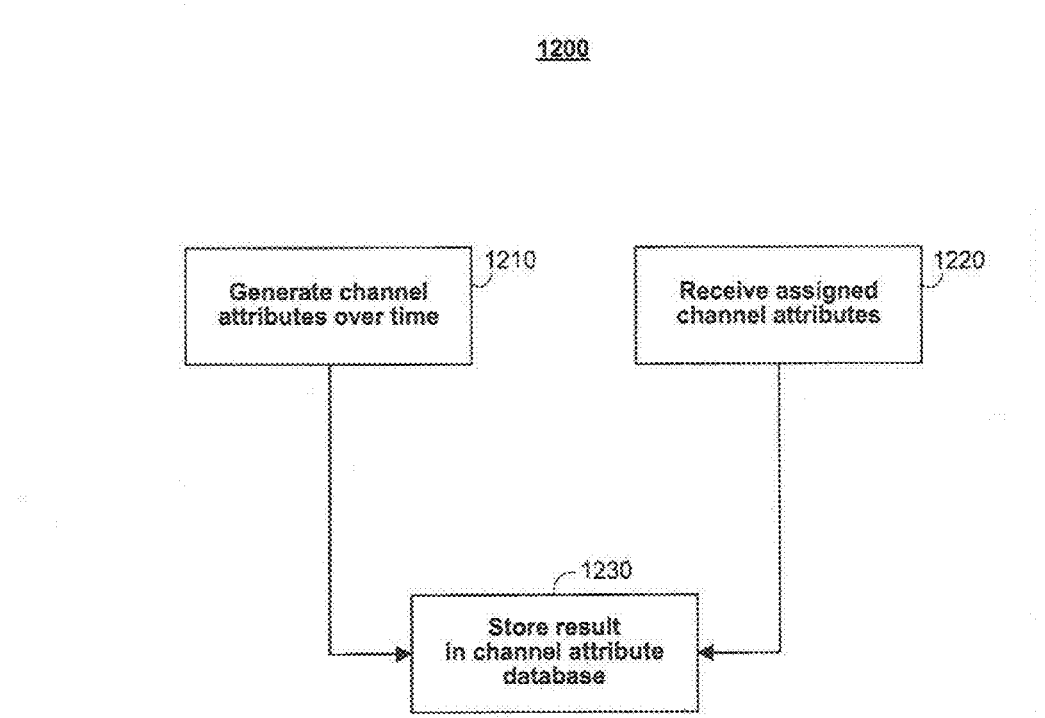
FIGS. 12 and 13 are flowcharts of an illustrative process for obtaining channel attribute data in accordance with one embodiment of the present invention.

FIG. 12 is an overview flowchart 1200 of an illustrative process for generating channel attribute data in accordance with one embodiment of the present invention. The flowchart has two paths for generating channel attribute data: "Generate channel attributes over time" 1210 and "Receive assigned channel attributes" 1220, each step then followed by step 1230 "Store result in channel attribute database." "Generate channel attributes over time" 1210 is explained in more detail in connection with FIG. 13. "Receive assigned channel attributes" receives those channel attributes which are entered into the channel attribute database 128 (FIG. 1) by a programmer, employee, or user, using a suitable computer system for this purpose (not shown). In some approaches, an operator of data source 126 manually assigns saved channel attribute data to each channel. To illustrate, these assigned channel attributes would be saved in table 260 (FIG. 2) for CBS. In other embodiments, control circuitry 130 runs a process which examines program identifiers of media for a channel (e.g., titles and genre information) over time, and based on suitable criteria (e.g., frequency) generates and saves channel attribute data for the channel. To illustrate, these generated channel attributes would be saved in table 250 (FIG. 2) for CBS. In some embodiments a combination of these approaches are used. It should also be noted that in some embodiments the interactive media guidance application automatically generates channel attribute data.

Once the system has generated or received the channel attribute data, at step 1230 the interactive media guidance application stores the result in the channel attribute database 128 (FIG. 1). This result will remain static until the interactive media guidance application generates or receives new channel attribute data.

The stored list of channel attribute data may be a complete list of all the channel attribute data gathered, or it may be a partial list. The interactive media guidance application may rank the list according to certain criteria, such as frequency. If it is a partial list, channel attribute data that do not reach a specified level on the criteria would have been eliminated by the interactive media guidance application.

Figure 13:
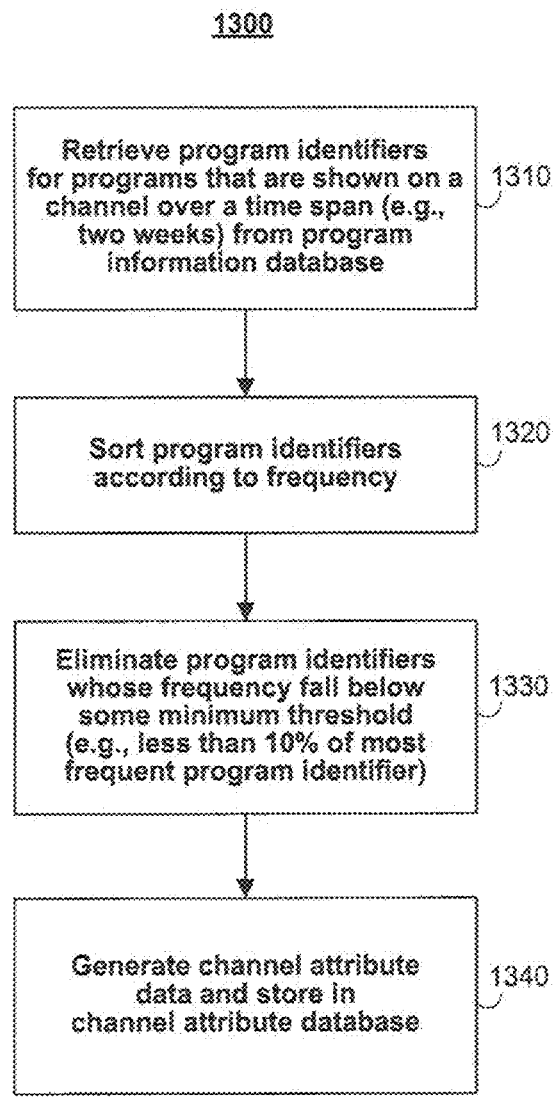

FIG. 13 is a flowchart 1300 of a more detailed method for generating channel attribute data over time 1210 (FIG. 12). This process may be performed on a regularly scheduled basis or when each channels-by-content search is performed. For clarity, the steps for generating channel attribute data will be described in the context of an embodiment in which the interactive media guidance application generates the information. First, the interactive media guidance application accesses a program information database that includes program identifiers for all programs that are shown on a channel over a time span. This database (not shown), which may be similar to the channel attribute database 264, would contain the program attributes for all programs shown on each channel. For example, program identifiers for Everybody Loves Raymond might include "Ray Romano" and "comedy." In step 1310 the interactive media guidance application retrieves the program identifiers for a specified period of time, e.g., two weeks. This time period may be programmed into the interactive media guidance application, but may also be entered by the user or varied by channel or other criteria.

Once the interactive media guidance application has retrieved all the programs' identifiers for the two week interval and stored them in temporary memory (not shown), the interactive media guidance application may rank the program identifiers according to a predefined ranking criteria, such as frequency, at step 1320. The interactive media guidance application orders the program identifiers accordingly. Rankings may be made based on, for example, frequency, level of importance, or level of specificity.

In the next step 1330, the interactive media guidance application may eliminate certain program identifiers that fall below some minimum threshold, e.g., less than 10% of the most frequent program identifier. To illustrate, if the most frequent program identifier occurred 100 times, at this step the interactive media guidance application would eliminate those program identifiers that occur less than 10 times (100*10%=10).

In the last step 1340, the interactive media guidance application generates a list of channel attribute data for each channel from the final list of program identifiers created in step 1330 and stores this list of channel attribute data in the channel attribute database 128 (FIG. 1), in the appropriate field-value pair. To illustrate, this list of channel attribute data would be saved in table 250 (FIG. 2) for CBS. In some embodiments, the interactive media guidance application generates the channel attributes by retrieving program attributes from a guidance application database (e.g., from data source 124 of FIG. 1) for each of the programs in the list. The program attributes may be assigned as channel attributes. For example, assuming that a channel in the list had a sufficient number of sporting events, the genres or categories associated with the events (e.g., sports, football, etc.) may be assigned to the channel and stored in table 250 (FIG. 2).

The above described embodiments of the present invention are presented for purposes of illustration and not of limitation, and the present invention is limited only by the claims which follow.

What is claimed is:

1. A method for searching for channels of programming based on the type of programming provided by the channels over time, comprising:
   receiving, at a user equipment device, channel search criteria entered by a user;
   in response to receiving the channel search criteria, initiating a search for channels, wherein the search comprises comparing the channel search criteria to channel attribute data of a plurality of channels to determine whether the channel attribute data matches the search criteria, and wherein the channel attribute data for a particular channel is generated at the user equipment device in response to determining characteristics of a plurality of programs that have been transmitted over the particular channel over a time period that precedes a time when a user request to access the particular channel is received, and wherein the generated channel attribute data is different from the characteristics of the plurality of programs; and
   generating a results display indicating the channels having channel attribute data matching the channel search criteria.

2. The method defined in claim 1 wherein
   the method further comprises generating a display of a plurality of categories;
   receiving the channel search criteria comprises receiving a selected category; and
   comparing the channel search criteria to the channel attribute data comprises comparing the selected category to the channel attribute data.

3. The method defined in claim 1 wherein
   the method further comprises generating a display of a plurality of keywords;
   receiving the channel search criteria comprises receiving a selected keyword from the plurality of keywords; and
   comparing the channel search criteria comprises comparing the selected keyword to the channel attribute data.

4. The method defined in claim 1 wherein
   receiving the channel search criteria comprises receiving a user-entered keyword or a partial keyword; and
   comparing the channel search criteria comprises comparing the user-entered keyword or the partial keyword to the channel attribute data.

5. The method defined in claim 1 further comprising:
   retrieving, for each of the plurality of channels, from a guidance application database, program attributes for programs provided by the channel over time; and
   generating channel attributes for each channel based on the program attributes of the programs provided by the channel over time.

6. The method defined in claim 1 wherein the results display is a mosaic wherein each cell of the mosaic represents a channel.

7. The method defined in claim 6 wherein at least one cell of the mosaic contains a graphic representing a channel.

8. The method defined in claim 6 wherein at least one cell of the mosaic contains video representing a channel.

9. The method of claim 1, wherein receiving channel search criteria comprises receiving a letter-by-letter entry of at least part of a keyword by a user.

10. The method of claim 1, wherein the channel attribute data for a particular channel is generated by:
receiving program identifiers for all programs that are shown on a channel during a specified period of time;
ranking the program identifiers according to a predefined ranking criteria; and
generating channel attribute data for the channel based on highly ranked program identifiers.

11. A system for searching for channels of programming based on the type of programming provided by the channels over time, comprising:
a user input device; and
control circuitry configured to:
receive, at a user equipment device, channel search criteria entered by a user using the user input device;
initiate a search for channels in response to receiving the channel search criteria, wherein the search comprises comparing the channel search criteria to channel attribute data of a plurality of channels to determine whether the channel attribute data matches the search criteria, and wherein the channel attribute data for a particular channel is generated at the user equipment device in response to determining characteristics of a plurality of programs that have been transmitted over the particular channel over a time period that precedes a time when a user request to access the particular channel is received, and wherein the generated channel attribute data is different from the characteristics of the plurality of programs; and
generate a results display indicating the channels having channel attribute data matching the channel search criteria.

12. The system defined in claim 11 wherein the channel search criteria comprise a category selected by the user from a display of a plurality of categories using the user input device.

13. The system defined in claim 11 wherein the channel search criteria comprise a keyword selected by the user from a display of a plurality of keywords using the user input device.

14. The system defined in claim 11 wherein the channel search criteria comprise a user-entered keyword or a partial keyword, entered by the user using the user input device.

15. The system defined in claim 11 wherein the system further comprises a storage device, and the control circuitry is further configured to:
retrieve, for each of the plurality of channels, from a guidance application database stored on the storage device, program attributes for programs provided by the channel over time; and
generate channel attributes for each channel based on the program attributes of the programs provided by the channel over time.

16. The system defined in claim 11 wherein the results display is a mosaic wherein each cell of the mosaic represents a channel.

17. The system defined in claim 16 wherein at least one cell of the mosaic contains a graphic representing a channel.

18. The system defined in claim 16 wherein at least one cell of the mosaic contains video representing a channel.

19. The system of claim 11, wherein the control circuitry is further configured to receive a letter-by-letter entry of at least part of a keyword by a user.

20. The system of claim 11, wherein the control circuitry is further configured to:
receive program identifiers for all programs that are shown on a channel during a specified period of time;
rank the program identifiers according to a predefined ranking criteria; and
generate channel attribute data for the channel based on highly ranked program identifiers.

* * * * *